US010235183B2

(12) United States Patent
Costa et al.

(10) Patent No.: US 10,235,183 B2
(45) Date of Patent: *Mar. 19, 2019

(54) BOOTING A SYSTEM-ON-A-CHIP DEVICE

(71) Applicant: HEWLETT-PACKARD DEVELOPMENT COMPANY, L.P., Houston, TX (US)

(72) Inventors: Carlos Haas Costa, Palo Alto, CA (US); Taciano Dreckmann Perez, Porto Alegre (BR); Thiago Silva, Porto Alegre (BR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/519,861

(22) PCT Filed: Jan. 29, 2015

(86) PCT No.: PCT/US2015/013466
§ 371 (c)(1),
(2) Date: Apr. 18, 2017

(87) PCT Pub. No.: WO2016/122518
PCT Pub. Date: Aug. 4, 2016

(65) Prior Publication Data
US 2018/0121210 A1    May 3, 2018

(51) Int. Cl.
*G06F 9/00* (2006.01)
*G06F 15/177* (2006.01)
*G06F 9/4401* (2018.01)

(52) U.S. Cl.
CPC .......... *G06F 9/4406* (2013.01); *G06F 9/4401* (2013.01); *G06F 9/4403* (2013.01); *G06F 9/4418* (2013.01)

(58) Field of Classification Search
None
See application file for complete search history.

(56) References Cited

U.S. PATENT DOCUMENTS 7,152,138 B2    12/2006    Spencer et al.
7,293,183 B2    11/2007    Lee et al.
(Continued)

FOREIGN PATENT DOCUMENTS

EP          1313028         5/2003
WO    WO-2004107168       12/2004
(Continued)

OTHER PUBLICATIONS

"ARM® Cortex™—M1 Embedded Processor Software Development Tutorial for Fusion Mixed-Signal FPGAs"; Nov. 2009; 44 pages.
Condit et al., < http://www.eecs.harvard.edu/cs261/notes/conduit-2009.html > Better I/O Through Byte-addressable, Persistent Memory, 2009 (3 pages).

(Continued)

*Primary Examiner* — Nitin C Patel
(74) *Attorney, Agent, or Firm* — Trop, Pruner & Hu P.C (57) ABSTRACT

Example implementations relate to booting a system comprising a system-on-a-chip (SOC) device. For example, boot code and system code comprising at least one selected from among an operating system and hypervisor code are stored in an on-chip non-volatile memory of a SoC device. By executing the boot code from the on-chip non-volatile memory, the system is booted from a mode in which power is removed from the system, where the booting includes loading the system code in the SoC device from the on-chip non-volatile memory without accessing storage off the SoC device.

20 Claims, 4 Drawing Sheets

(56) References Cited

U.S. PATENT DOCUMENTS

| | | |
|---|---|---|
| 7,550,994 B1 | 6/2009 | Camarota et al. |
| 8,205,070 B2 | 6/2012 | Toelkes |
| 8,433,886 B2 | 4/2013 | Lee |
| 8,443,211 B2 | 5/2013 | Zhao et al. |
| 8,522,004 B2 | 8/2013 | Borras |
| 8,539,216 B1 | 9/2013 | Feng et al. |
| 2002/0129191 A1 | 9/2002 | Dacosta |
| 2003/0097510 A1* | 5/2003 | Joseph ............... G06F 15/7842 710/305 |
| 2004/0044917 A1 | 3/2004 | Lee et al. |
| 2005/0268086 A1* | 12/2005 | Kim ...................... G06F 9/4401 713/2 |
| 2006/0242398 A1 | 10/2006 | Fontijn et al. |
| 2008/0294838 A1 | 11/2008 | Houston et al. |
| 2011/0231595 A1 | 9/2011 | Wakrat et al. |
| 2012/0151125 A1 | 6/2012 | Yang |
| 2013/0042057 A1 | 2/2013 | Sinclair et al. |
| 2013/0159602 A1 | 6/2013 | Adams et al. |
| 2014/0164725 A1 | 6/2014 | Jang et al. |
| 2014/0164753 A1 | 6/2014 | Lee |
| 2014/0181495 A1 | 6/2014 | Jang et al. |
| 2014/0245294 A1 | 8/2014 | Kaul |
| 2014/0281464 A1 | 9/2014 | Le et al. |

FOREIGN PATENT DOCUMENTS

| | | |
|---|---|---|
| WO | WO-2007050176 A2 | 5/2007 |
| WO | WO-2015167455 A1 | 11/2015 |

OTHER PUBLICATIONS

Costa et al., Int. Appl. No. PCT/US2015/013468 entitled Resuming a System-On-A-Chip Device filed Jan. 29, 2015 (29 pages).

Hewlett-Packard Development Company, L.P., International Appl. No. PCT/US2014/012433 filed Jan. 22, 2014 (37 pages).

Moraru et al., < http://www.pdl.cmu.edu/PDL-FTP/NVM/CMU-PDL-11-114v2.pdf > Persistent, Protected and Cached: Building Blocks for Main Memory Data Stores, Nov. 2012 (28 pages).

Ng, C.; "On-chip Nonvolatile Memory Proves Ideal for Consumer Applications"; May 23, 2005; 10 pages.

Perez, International Application No. PCT/US2014/35836, "Resuming A System Using State Information," Apr. 29, 2014, 25 pages.

Inwhee Joe et al:"Bootup time improvement for embedded Linux using snapshot images created on boot time", Next Generation Information Technology (ICNIT), 2011 The 2nd International Conference on, IEEE, Jun. 21, 2011 (Jun. 21, 2011), pp. 193-196, XP031907559.

* cited by examiner

BOOTING A SYSTEM-ON-A-CHIP DEVICE

BACKGROUND

An electronic device can include a volatile system memory, a non-volatile memory, and secondary storage. The volatile system memory of an electronic device can be implemented with one or multiple volatile memory devices. A volatile memory device loses its data if power is removed from the memory device. The non-volatile memory and the secondary storage can be implemented using one or multiple non-volatile (or persistent) memory or storage devices. A non-volatile memory or storage device retains its stored content even if power is removed from the non-volatile memory or storage device.

BRIEF DESCRIPTION OF THE DRAWINGS

Some implementations are described with respect to the following figures.

DETAILED DESCRIPTION

As integrated circuit technology has advanced, the number of features that can be incorporated onto an integrated circuit chip has increased. An integrated circuit chip on which a processor, an on-chip memory, and other components are provided can be referred to as a system-on-a-chip (SoC) device. A SoC device can refer generally to any chip including an integrated circuit die or an arrangement of dies that is (are) encapsulated within a package, and on which at least a processor and an on-chip memory are provided. An "on-chip" memory can refer to a memory device(s) that is (are) mounted in the same chip as the processor and possibly other components.

Traditionally, to start a system, a boot procedure of the system can be performed, in which boot code and an operating system are loaded from respective storage devices that are off (external of) the SoC device. Booting a system involves restarting the operating system of the system from an initial state, where the initial state is a specified starting state of the operating system. When booting the system, data not stored to persistent storage would be lost. Booting the system to start from an initial state is contrasted to resuming the system to a prior state.

In some examples, the boot code can be loaded from a non-volatile memory (e.g. a flash memory device), while the operating system can be loaded from secondary storage, which can be implemented with a solid state drive (implemented with one or multiple flash memory devices) and/or a disk-based storage drive.

The boot code and operating system are copied from the respective memory or storage devices to the on-chip memory of the SoC device. The copying of the boot code and the operating system from off-chip memory or storage devices to the on-chip memory of the SoC device can take a relatively long period of time, which can lengthen the time involved in booting a system.

In accordance with some implementations according to the present disclosure, a SoC device is provided with an on-chip non-volatile memory that stores information to allow the SoC device, or more generally, a system including the SoC device, to use the stored information in the on-chip non-volatile memory to boot the or system. Booting the system can refer to booting just the SoC device, or booting the SoC device plus other components of the system, including hardware devices and/or machine-executable instructions.

The information stored on the on-chip non-volatile memory of the SoC device can include boot code (machine-executable instructions) and system code, where the system code includes at least one selected from among an operating system and hypervisor code. The operating system and the hypervisor code are also implemented as machine-executable instructions.

An operating system can include a kernel that manages access by code (e.g. applications or other code) of hardware resources in a system, performs file access management (to manage access of files and other data in the system), performs process management (to manage execution of processes, such as those of applications), and so forth. The operating system can also include additional logic, in addition to the kernel, which can perform specified tasks (examples of such additional logic can include a user interface application, libraries, etc.).

Hypervisor code is executed in a system to perform virtualization of the hardware resources of the system. Using a hypervisor, multiple virtual machines can be implemented in the system, where each virtual machine includes a respective operating system and applications. Access of the hardware resources by the virtual machines are performed through the hypervisor.

The booting is accomplished by executing the boot code from the on-chip non-volatile memory. The system is booted from a mode in which power was removed from the system, such as a power off state (where power is removed from a system), or a lower power state such as a sleep state or hibernation state. Power being removed from the system can refer to power being removed from just a part of the system, or an entirety of the system. The boot code can be executed in place (XIP) from the on-chip non-volatile memory of the SoC device, which refers to executing the boot code from the on-chip non-volatile memory without first copying the boot instructions to a volatile main memory. In other examples, the boot code can be copied to another memory (volatile or non-volatile memory), which may also be on chip. Such other memory can include a static random access memory (SRAM), a cache, a main memory, or another memory. As an example, a memory (e.g. SRAM, etc.) on the SoC device can be used to execute code from the memory before the memory is used as a cache.

At the end of the boot sequence, the boot code loads the system code (operating system and/or hypervisor code) from the on-chip non-volatile memory of the SoC device. The loading of the system code for execution by the processor of the SoC device can be accomplished without accessing storage off (external of) the SoC device.

Figure 1A:
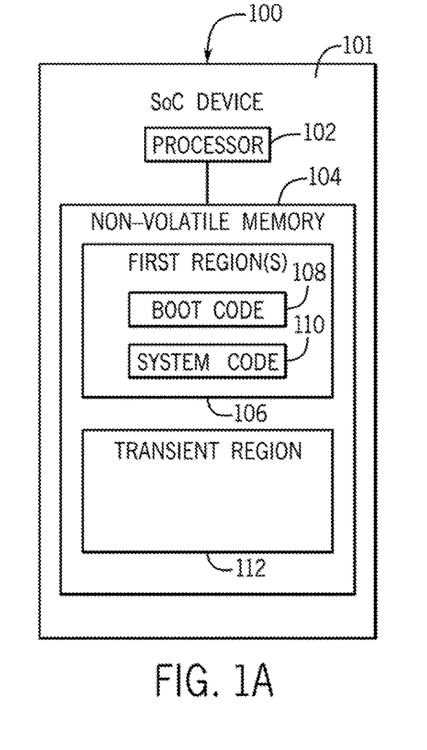
FIGS. 1A-1B are block diagrams of example system-on-a-chip (SoC) devices, according to various implementations.

FIG. 1A is a block diagram of an example SoC device 100 according to some implementations. The SoC device 100 includes a processor 102 and an on-chip non-volatile memory 104. Although just one processor 102 is depicted, it is noted that the SoC device can include multiple processors.

In some examples, the processor 102 can be a processor core. There can be multiple processor cores in the SoC device 100.

The processor 102 and the on-chip non-volatile memory 104 can be formed on a common integrated circuit die 101 of the SoC device 100. Alternatively, the processor 102 and the non-volatile memory 104 can be provided on multiple integrated circuit dies that are completely encapsulated within a common package. The package also supports contacts (e.g. electrical contacts, optical elements, etc.) of the SoC device 100. In some examples, the on-chip non-volatile memory 104 may include a non-transitory storage medium.

The non-volatile memory 104 can be implemented with any of various of different types of non-volatile memory technologies. As examples, the non-volatile memory 104 can include any one or some combination of the following: resistive random access memory (RRAM), memristor memory, phase-change random access memory (PCM, PCRAM, or PRAM), magnetoresistive random access memory (MRAM), spin-transfer torque random access memory (STT-RAM), a flash memory, a backup-power-backed (e.g. battery-backed) dynamic random access memory (DRAM), and so forth.

In some implementations, the non-volatile memory 104 can be a byte-addressable memory. A byte-addressable memory is a memory in which individual bytes of data can be read and written. In other words, an individual byte of data can be read from or written to the byte-addressable memory without reading/writing other parts of memory. A byte-addressable memory is distinguishable from a memory where a read operation or a write operation has to be performed on a block of data, where the block of data is larger than a byte.

The non-volatile memory 104 can store various information, in multiple logical regions of the non-volatile memory. A "logical region" of a memory can refer to a defined segment of the memory, where the segment can include contiguous memory locations or non-contiguous memory locations.

In the example of FIG. 1A, the logical regions of the non-volatile memory 104 include at least one first region 106 to store boot code 108 and system code 110 (operating system and/or hypervisor code). In addition, the non-volatile memory 104 includes a transient region 112 to store certain data. In some examples, the data contained in the transient region 112 can include data that is stored in volatile main memory in traditional systems. In such examples, by providing the transient region 112 in the non-volatile memory 104 to store information of the volatile main memory, a separate volatile main memory would not have to be provided in the system that includes the SoC device 100.

Examples of data in the transient region 112 include machine-executable instructions of programs, temporary data used by drivers, an operating system, and program processes, temporary file data, information regarding a current state of the operating system, a current state of bare-metal code, a current state of certain application programs, a current state of certain hardware devices, and so forth.

Figure 3A:
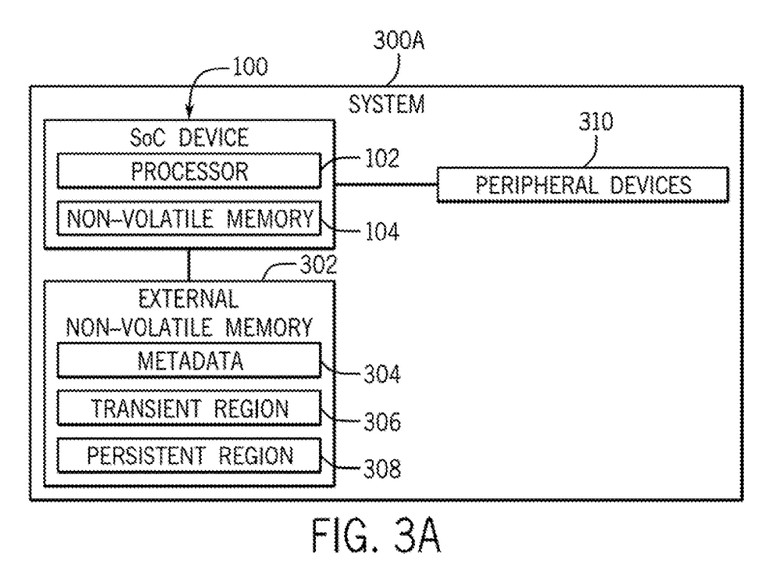
FIGS. 3A-3B are block diagrams of example systems including a SoC device according to some implementations.
Figure 3B:
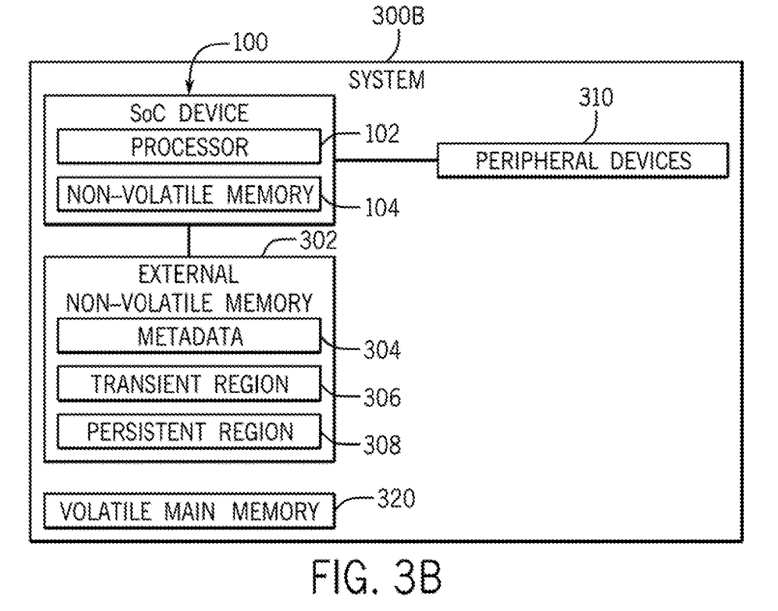

When a system including the SoC device 100 (examples of systems are shown in FIGS. 3A and 3B) is booted in response to a power cycle, the data of the transient region 112 is discarded (overwritten or deleted) when power is removed from the system. A power cycle refers to removing power from the SoC device 100 (or a system including the SoC device 100) followed by subsequently applying, power to the SoC device 100 (or the system including the SoC device 100).

However, if the system is resumed from a mode in which power has been removed from the system to a prior state, then the data in the transient region 112 is maintained and reused. Resuming the system to the prior state can be based on state information (not shown), which can be stored in the non-volatile memory 104. The state information can include data copied from registers of the processor 102 and a cache (which can be part of the processor 102 or outside of the processor 102). The registers and cache are volatile storage, such that the data in the registers and cache are volatile data that would be lost if power is removed from the SoC device 100. Examples of registers can include a current value of a program counter, information relating to a configuration of the system, data produced by arithmetic operations, and so forth. The cache can store machine-executable instructions of programs and also data, where the instructions and data can be copies retrieved into the cache from another storage. The state information can also include information relating to a current execution state of machine-executable instructions (e.g. an operating system, application code, etc.) that were executing in the system prior to entering a lower power state. The state information can also include current data processed by the machine-executable instructions. The state information can also include information relating to states of hardware devices.

The information stored in the first region(s) 106 is persistent even when the system is booted from a mode in which power has been removed from the system. Thus, in response to a power cycle of the system that causes the system to boot, the data contained in the transient region 112 is discarded, while information in the first region(s) 106 is maintained and used.

The boot code 108 can include the following, as examples: a bootloader (machine-executable instructions that are used to load other code, such as further boot code, an operating system, or hypervisor code), Basic Input/Output System (BIOS) code or Unified Extensible Firmware Interface (UEFI) code (BIOS code or UEFI code includes machine-executable instructions that are used to perform initialization of a system), a file system, and so forth. A file system stored in the on-chip non-volatile memory 104 can include information that describes files and directories stored in a system including the SoC device 100.

Figure 1B:
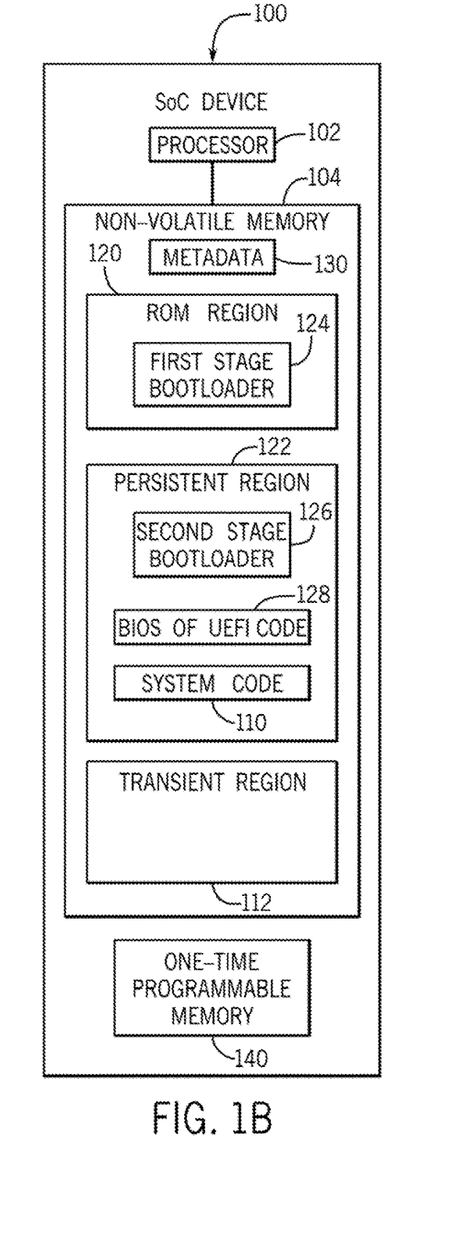

FIG. 1B is a block diagram of the SoC device 100 according to further implementations. In FIG. 1B, the first region(s) 106 of FIG. 1A correspond to a read-only memory (ROM) region 120 and a persistent region 122, in addition to the transient region 112 in the non-volatile memory 104.

Both the ROM region 120 and the persistent region 122 contain data or other information that is to be maintained persistent even if power is removed from the SoC device 100.

The ROM region 120 can be used to store certain information, such as a first stage bootloader 124. In other examples, the ROM region 120 can also be used to store certain management information for the SoC device 100.

The first stage bootloader 124 is the first boot code executed when the SoC device 100 is started. The first stage bootloader 124 is used to start a second stage bootloader 126, which can be stored in the persistent region 122. The second stage bootloader 126 can perform additional functions associated with starting the SoC device 100. The second stage bootloader 126 can be used to invoke further boot code such as BIOS or UEFI code. The second stage bootloader 126 can also load an operating system or hypervisor code. More generally, the first stage bootloader 124 is an example of a first portion of boot code, and the second stage bootloader 126 is an example of a second portion of boot code.

In the example of FIG. 1B, the persistent region 122 also stores other code, including BIOS or UEFI code 128 and the system code 110 (operating system and/or hypervisor code). In other examples, the second stage bootloader 126 and/or BIOS or UEFI code 128 can be stored in the ROM region 120 instead of in the persistent region 122.

It is noted that the content of the ROM region 120 can be updated, such as to update the first stage bootloader 124, the second stage bootloader 126, or the BIOS or UEFI code 128 that is stored in the ROM region 120. The update of the content of the ROM region 120 is performed by a trusted process executing on the SoC device 100.

In some examples, the ROM region 120 and the persistent region 122 can be used to store information that may be stored in external non-volatile memory and/or secondary storage of traditional systems. By employing the on-chip non-volatile memory 104 in the SoC device 100, certain memory and/or storage devices that are external of the SoC device 100 can be omitted, such as a volatile main memory, flash memory, and/or secondary storage. By omitting such external memory and/or storage devices, the cost associated with a system that includes the SoC device 100 can be reduced due to the reduction of the number of components in the system.

As depicted in FIG. 1B, the non-volatile memory 104 can also store metadata 130, which can include various parameters and information that relate to the on-chip non-volatile memory 104 as well as the SoC device 100. The metadata 130 can include structured metadata or unstructured metadata. Structured metadata refers to metadata that has a specific format or schema, while unstructured metadata refers to metadata without a specific format or schema.

The metadata 130 can include non-volatile regions information. The non-volatile regions information can include memory address values that specify the starting locations of each of the different multiple regions (including the ROM region 120, the persistent region 122, and the transient region 112, as well as other regions) in the non-volatile memory 104. In other examples, the non-volatile memory regions information can include information that point to the logical division of the non-volatile memory regions, and also describes different attributes of each region.

The metadata 130 can also include a boot-resume indicator for indicating whether a system is to be resumed or booted when starting from a mode in which power has been removed from the system. The boot-resume indicator can be in the form of a flag that is settable to one of multiple different values. If the boot-resume indicator is set to a first value, then that indicates that the system is to be resumed when the system is started from a mode in which power has been removed from the system. If the boot-resume indicator is set to a second, different value, then that indicates that the system is to be booted when the system is started from a mode in which power has been removed from the system.

To resume the system from a mode in which power has been removed from the system, state information (relating to a prior state of the SoC device 100 or a system that includes the SoC device 100) can be read from the on-chip non-volatile memory 104.

In some examples, the metadata 130 can also define one or multiple secure regions in the non-volatile memory 104 that store information that can be used to perform secure operations of the SoC device 100. The secure region(s) is (are) regions of the non-volatile memory 104 accessible by predefined or specified entities of the SoC device 100, such that unauthorized entities (e.g. malware code, etc.) would not be able to access such secure region(s).

Figure 2:
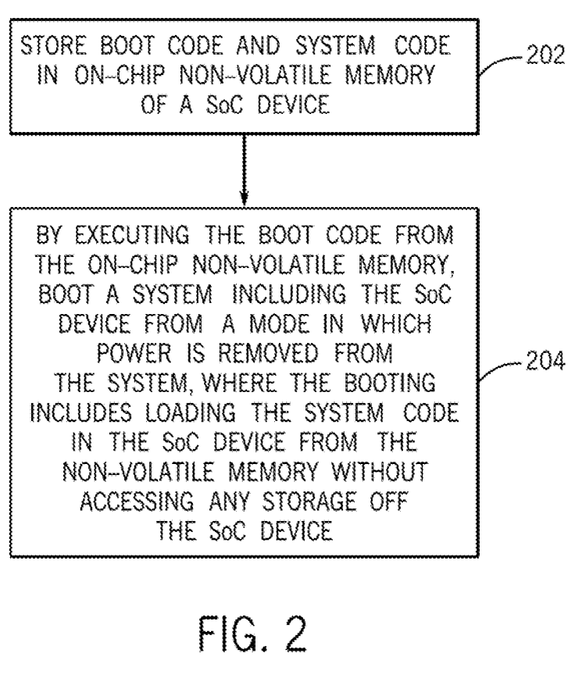
FIG. 2 is a flow diagram of an example process to boot a system including a SoC device according to some implementations.

FIG. 2 is a flow diagram of a process to boot a system including the SoC device 100 according to some implementations. The process of FIG. 2 can be performed by the SoC device 100. The SoC device 100 stores (at 202) the boot code 108 and the system code 110 in the on-chip non-volatile memory 104. The system code 110 includes at least one selected from among an operating system and hypervisor code.

By executing the boot code 108 from the on-chip non-volatile memory 104, the system is booted (at 204) from a mode in which power is removed from the SoC device 100. The booting includes loading the system code 110 in the SoC device 100 from the on-chip non-volatile memory 104 without accessing storage off the SoC device 100. In some examples, the boot code 108 can be executed in place from the on-chip non-volatile memory 104 (without having to first copy the boot code 108 from the on-chip non-volatile memory 104 to a volatile main memory).

FIG. 3A shows an example of a system 300A that includes the SoC device 100 and an external non-volatile memory 302 (which is external of the SoC device 100). Examples of systems can include any or some combination of the following: desktop computers, notebook computers, tablet computers, server computers, smart phones, personal digital assistants, mobile phones, wearable devices, communication devices, storage servers, game appliances, smart sensors, Internet of Things (IoT) devices, home controllers, system controllers, micro-controllers, and so forth.

The external non-volatile memory 302 can store metadata 304, and can include a transient region 306 and a persistent region 308, which are arranged to store similar content as the respective transient region 112 and persistent region 122 in the on-chip non-volatile memory 104 of FIG. 1B. The presence of the external non-volatile memory 302 adds to the capacity available in the on-chip non-volatile memory 104. The metadata 304 can include information relating to the regions 306 and 308 of the external non-volatile memory 302.

In addition to the SoC device 100 and the external non-volatile memory 302, the system 300A can also include other components, including peripheral or I/O devices 310 (e.g. network interface controller, video card controller, display device, etc.).

FIG. 3B shows another example system 300B that includes a volatile main memory 320 in addition to the SoC device 100, the external non-volatile memory 302, and the peripheral devices 310 of FIG. 3A. The volatile main memory 320 is external of the SoC device 100 and can be implemented using a dynamic random access memory (DRAM), a static random access memory (SRAM), or any other type of volatile memory. In examples where the volatile main memory 320 is present, the transient region 112 and/or 306 of the respective on-chip non-volatile memory 104 and external non-volatile memory 302 would not have to store information that is stored in the volatile main memory 320.

Figure 4:
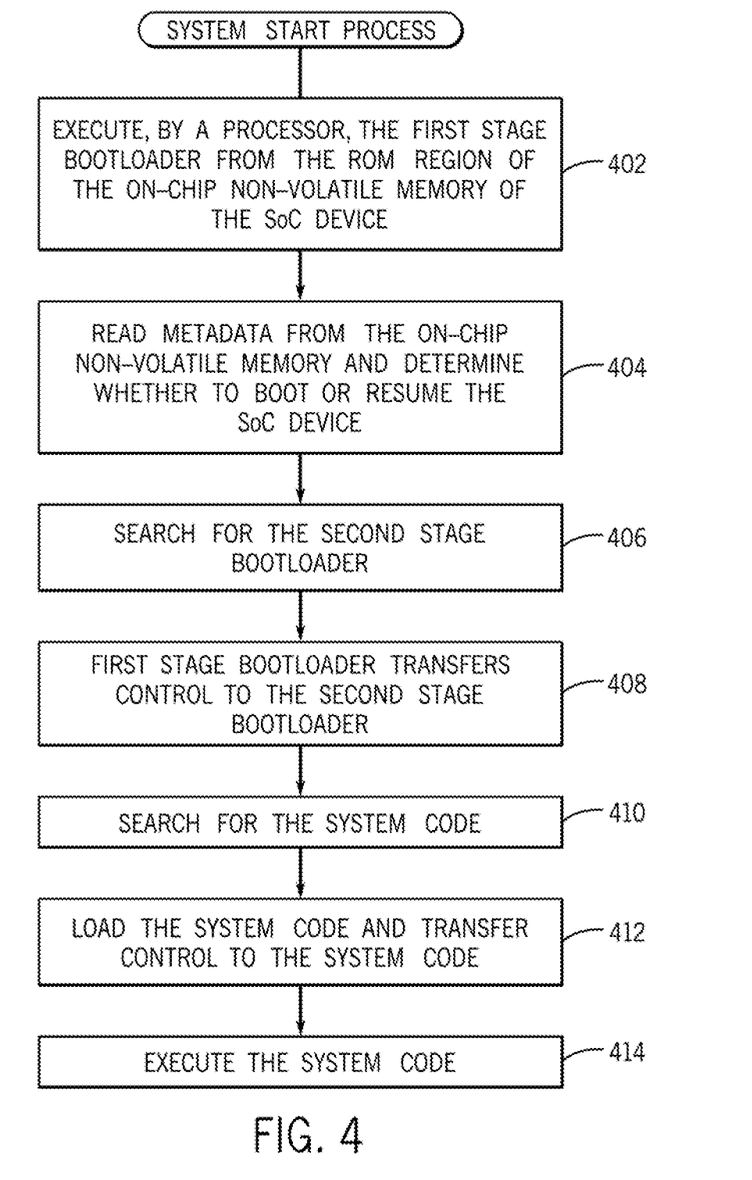
FIG. 4 is a flow diagram of an example process performed in the system of FIG. 3A or 3B, according to further implementations.

FIG. 4 is a flow diagram of an example process of starting the system 300A of FIG. 3A, in accordance with some implementations. As part of starting the system 300A from a mode in which power is removed from the system 300A, the processor 102 of the SoC device 100 executes (at 402) the first stage bootloader 124 from the ROM region 120 in the on-chip non-volatile memory 104. Without having to access or initialize any peripheral devices outside the SoC device 100, the processor 102 can read (at 404) the metadata 130 (and more specifically the boot-resume indicator discussed above) from the on-chip non-volatile memory 104, and determine, based on the metadata 130, whether to boot or resume the system 300A.

The following assumes that the boot-resume indicator specifies that the system 300A is to be booted.

The first stage bootloader 124 searches (at 406) for the second stage bootloader 126, which as depicted in FIG. 1B can be stored in the persistent region 122 of the on-chip non-volatile memory 104. In other examples, the second stage bootloader 126 may be stored on the external non-volatile memory 302. The metadata 130 can be used to identify the location where the second stage bootloader 126 is located.

The first stage bootloader 124 then transfers control (at 408) to the second stage bootloader 126. The second stage bootloader 126 searches (at 410) for the system code 110. Locating the system code 110 can be based on the metadata 130, which can include information identifying the location of the system code 110. The second stage bootloader 126 loads (at 412) the system code 110, and transfers control to the system code 110. The system code 110 is then executed (at 414), which continues operation of the SoC device 100.

The first stage bootloader 124, the second stage bootloader 126, the BIOS or UEFI code 128, and the system code 110 can be executed in place in the non-volatile memory 104, or alternatively, any of the foregoing code can first be transferred to the transient region 112 before execution of the code starts.

A similar system start process as depicted in FIG. 4 can be performed with the system 300B of FIG. 3B, except that the volatile main memory 320 is used. The entire address space of the volatile main memory 320 is considered a transient region. When the volatile main memory 320 is present, the storage capacity of the on-chip non-volatile memory 104 available for the persistent region 122 and the ROM region 120 can be increased, to expand storage capacity. In some examples, when the volatile main memory 320 is present, the transient region 112 can be omitted from the non-volatile memory 104. In other examples, when the volatile main memory 320 is present, the transient region 112 can still be present in the non-volatile memory 104.

In some implementations, policies can be associated with the respective logical regions in the non-volatile memory 104. These policies can be enforced using hardware logic, such as a processor, a memory controller, or another hardware component. Examples of policies can include a read-only policy for the ROM region 120. The read-only policy can specify that a write to the ROM region 120 is not permitted, unless by a specified entity that is authorized to perform an update of content of the ROM region 120. Another example policy can be the policy associated with the transient region 112, which specifies that data in the transient region 112 is discarded in response to boot. A further policy can be associated with the persistent region 122, which specifies that information stored in the persistent region 122 is to be protected against spurious writes, such as during a boot process. Moreover, a policy can be associated with the metadata 130, which can specify that the metadata 130 is to be write protected, except during times when management of memory regions is being performed.

In some implementations, one or multiple regions (e.g. region storing metadata, persistent region, etc.) of the non-volatile memory 104 or 302 can be encrypted using keys. Also, trusted management mechanisms can be used for maintaining or updating metadata, content of the ROM region 120, and performing encryption and decryption using keys.

In some implementations, the SoC device 100 can include an electrical fuse (eFuse) memory 140 (FIG. 1B), which is a one-time programmable memory that can only be programmed once. As an example, the eFuse memory can be used to store information specifying attributes of the on-chip non-volatile memory 104. Examples of such attributes can include a read-only attribute (to specify whether a region is read-only) or other attributes. Values stored in the eFuse memory can allow or block the access by the processor 102 to certain regions of the on-chip non-volatile memory 104 or external non-volatile memory 302. As an example, the information in the eFuse memory can allow a write to an example given region A of the non-volatile memory. After the write to region A of the non-volatile memory, a one-time write is performed to change the eFuse memory to prevent any further writes of region A of the non-volatile memory.

In implementations that include multiple processors in the SoC device 100, a selected one of the multiple processors in the SoC device 100 can be used to perform the boot tasks. This can be performed for security reasons. For example, certain processors in the SoC device 100 may be used for specific tasks as a hardware guarantee for a safe boot.

Although the various examples discussed above depict one transient region and one persistent region in the on-chip non-volatile memory 104, it is noted that the on-chip non-volatile memory 104 can include multiple transient regions and multiple persistent regions for respective different operating systems.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
storing, in an on-chip non-volatile memory of a system-on-a-chip (SoC) device, boot code and system code comprising at least one selected from among an operating system and hypervisor code;
booting, by executing the boot code from the on-chip non-volatile memory, a system comprising the SoC device from a mode in which power is removed from the system, the booting comprising loading the system code in the SoC device from the on-chip non-volatile memory without accessing storage that is off the SoC device; and
executing in place the boot code and the system code in the on-chip non-volatile memory.

2. The method of claim 1, wherein loading the operating system comprises loading a kernel and other logic of the operating system.

3. The method of claim 1, further comprising:
storing a file system in the on-chip non-volatile memory.

4. The method of claim 1, wherein the on-chip non-volatile memory includes a plurality of logical regions comprising a persistent region, a read-only memory region, and a transient region, the read-only memory region comprising a first portion of the boot code, and the persistent region comprising the system code and a second portion of the boot code, the method further comprising:
accessing metadata in the on-chip non-volatile memory to locate the plurality of logical regions.

5. The method of claim 4, further comprising:
discarding data in the transient region of the on-chip non-volatile memory in response to a boot of the system.

6. The method of claim 4, further comprising:
enforcing, using hardware logic of the SoC device, different policies relating to respective logical regions of the plurality of logical regions.

7. A method comprising:
storing, in an on-chip non-volatile memory of a system-on-a-chip (SoC) device, boot code and system code comprising at least one selected from among an operating system and hypervisor code;
booting, by executing the boot code from the on-chip non-volatile memory, a system comprising the SoC device from a mode in which power is removed from the system, the booting comprising loading the system code in the SoC device from the on-chip non-volatile memory without accessing storage that is off the SoC device; and
reading metadata stored in the on-chip non-volatile memory to determine whether to boot or resume the system,
wherein the booting is performed in response to the metadata indicating that the system is to be booted.

8. The method of claim 7, wherein the on-chip non-volatile memory includes a plurality of logical regions comprising a persistent region and at least one of a read-only memory region and a transient region, the read-only memory region comprising a first portion of the boot code, and the persistent region comprising the system code and a second portion of the boot code, the method further comprising:
accessing the metadata in the on-chip non-volatile memory to locate the plurality of logical regions.

9. The method of claim 8, further comprising:
discarding data in the transient region of the on-chip non-volatile memory in response to a boot of the system.

10. A system-on-a-chip (SoC) device comprising:
a processor; and
a non-volatile memory including a plurality of regions, at least a first region of the plurality of regions to store boot code and system code comprising at least one selected from among an operating system and hypervisor code, and the plurality of regions further comprising a transient region to store data that is discarded in response to a boot of the SoC device; and
the boot code executable on the processor to boot a system comprising the SoC device from a mode in which power is removed from the system, the booting comprising loading the system code from the non-volatile memory without accessing storage that is off the SoC device, wherein the boot code comprises a first stage bootloader and a second stage bootloader, and wherein the plurality of regions comprise a read-only memory (ROM) region to store the first stage bootloader, and a persistent region to store the second stage bootloader that is invocable by the first stage bootloader, the persistent region to further store the system code.

11. The SoC device of claim 10, wherein the loading of the system code comprises loading of the operating system that comprises a kernel and additional logic.

12. The SoC device of claim 10, further comprising a one-time programmable memory to store information that initially allows a write to a given region of the plurality of regions in the non-volatile memory, and after the information in the one-time programmable memory is changed, a further write to the given region is prevented.

13. The SoC device of claim 10, wherein the non-volatile memory is to store metadata, and the processor is to access the metadata in the non-volatile memory to locate the plurality of regions.

14. The SoC device of claim 10, further comprising hardware to enforce different policies relating to respective regions of the plurality of regions in the non-volatile memory.

15. A system-on-a-chip (SoC) device comprising:
a processor; and
a non-volatile memory including a plurality of regions, at least a first region of the plurality of regions to store boot code and system code comprising hypervisor code, and the plurality of regions further comprising a transient region to store data that is discarded in response to a boot of the SoC device; and
the boot code executable on the processor to boot a system comprising the SoC device from a mode in which power is removed from the system, the booting comprising loading the system code from the non-volatile memory without accessing storage that is off the SoC device, wherein the loading of the system code comprises loading of the hypervisor code that upon execution causes virtualization of hardware resources of the system.

16. The SoC device of claim 15, wherein the boot code comprises a first stage bootloader and a second stage bootloader, and wherein the plurality of regions comprise a second region to store the first stage bootloader, and the first region is to store the second stage bootloader that is invocable by the first stage bootloader.

17. The SoC device of claim 15, wherein the non-volatile memory is to store metadata, and the processor is to access the metadata in the non-volatile memory to locate the plurality of regions in the non-volatile memory.

18. A system comprising:
peripheral devices; and
a system-on-a-chip (SoC) device comprising:
a processor; and
a non-volatile memory including a plurality of regions, at least a first region of the plurality of regions to store a first boot code, a second boot code, and system code comprising at least one selected from among an operating system and hypervisor code, the non-volatile memory to further store metadata relating to the plurality of regions; and
the processor to, as part of booting the system from a mode in which power is removed from the system:
execute the first boot code, the first boot code executable on the processor to find the second boot code using the metadata;
execute the second boot code, the second boot code executable on the processor to find the system code and to load the system code without accessing storage that is off the SoC device; and
execute the system code.

19. The system of claim 18, wherein the plurality of regions comprise a transient region to store data associated with a volatile main memory, wherein presence of the transient region allows omission of the volatile main memory from the system.

20. The system of claim 18, wherein the non-volatile memory is to store metadata, and the processor is to access the metadata in the non-volatile memory to locate the plurality of regions in the non-volatile memory.

* * * * *